United States Patent [19]
Perrotin

[11] 3,903,979
[45] Sept. 9, 1975

[54] HEAVY-DUTY MOTOR VEHICLES
[75] Inventor: Jean Perrotin, Saint-Bris-Le-Vineux, France
[73] Assignee: Jean Nicolas & Fils, France
[22] Filed: May 17, 1974
[21] Appl. No.: 471,146

[52] U.S. Cl. ............ 180/23; 180/79.2 C; 280/81 R
[51] Int. Cl.² ........................................ B62D 61/10
[58] Field of Search ............ 180/79.2 C, 22, 23, 24; 280/80 R, 81 R, 81 A

[56] References Cited
UNITED STATES PATENTS
| | | | |
|---|---|---|---|
| 3,387,684 | 6/1968 | Belke et al. | 180/79.2 C |
| 3,680,653 | 8/1972 | Murata et al. | 180/23 |

Primary Examiner—David Schonberg
Assistant Examiner—John A. Pekar
Attorney, Agent, or Firm—Larson, Taylor and Hinds

[57] ABSTRACT

A steering mechanism for a self-propelled vehicle is carried by a plurality of rows each of several axles. It has a main steering system for angular control of all said axles by the driver for causing the vehicle to follow a circular path with all axles converging toward the center of the circular path. Each of the axles is provided with a locking mechanism for optional coupling or uncoupling of the axle with the main steering system. An additional system for angularly moving the axles to or from a position transverse to the position of straight front movement of the vehicle, comprises power cylinders independent from the main driving system and operatively connected to said axles and which in de-activated condition do not impede control of the axles by the main steering system.

10 Claims, 10 Drawing Figures

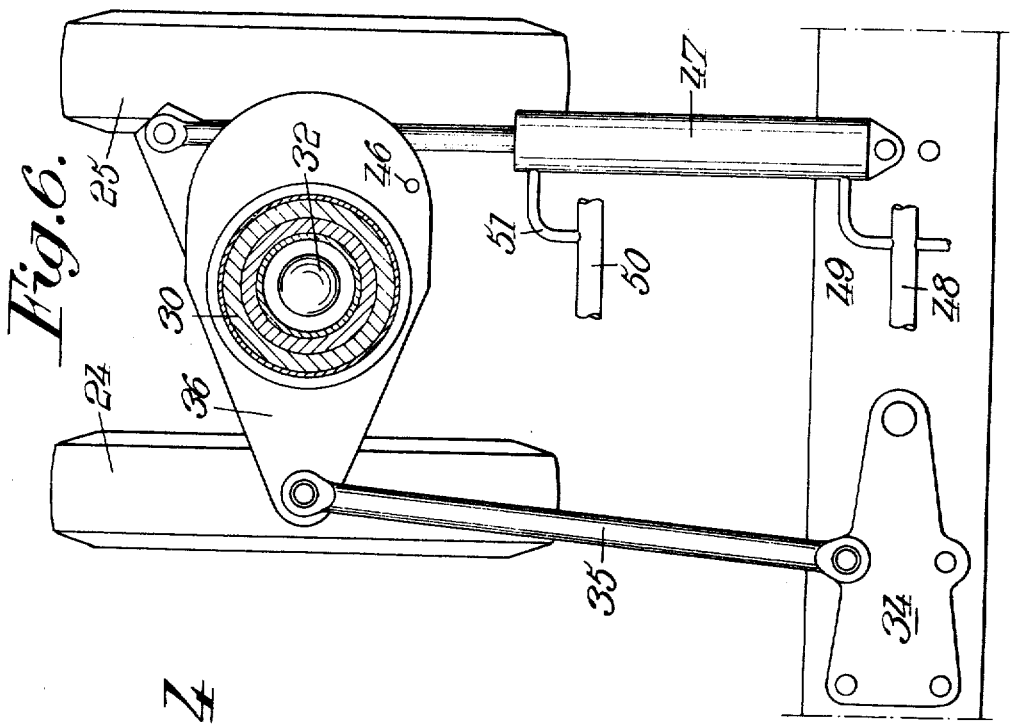
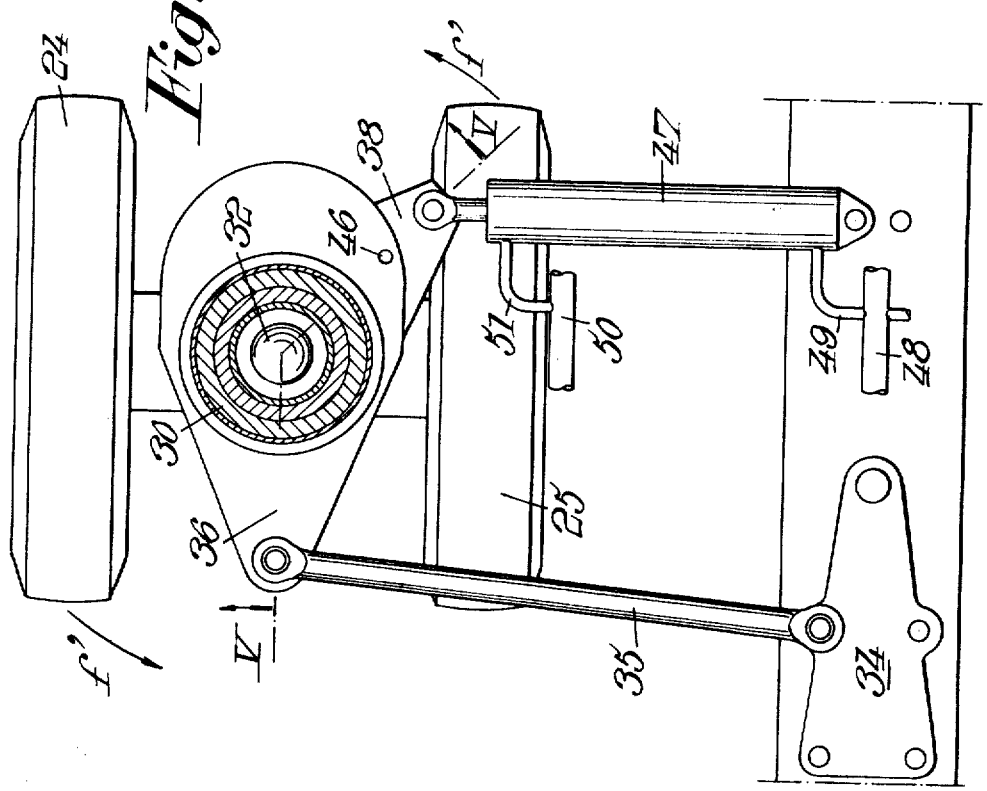

HEAVY-DUTY MOTOR VEHICLES

The present invention relates to selfdriven vehicles for carrying heavy loads and more particularly, although not exclusively, to selfpropelled platforms with a large number of axles used for the short distance transportation of non-divisible large-sized parts in ports and on heavy worksites (for example in ship-building dockyards).

Platforms of this type often include several lines of several axles, this term having to be interpreted here as denoting a pair of wheels (or a pair of twin wheels, or a pair of groups of three wheels or even more), mounted on the same axle carrying the suspension at its middle. The axles of several lines are generally drive axles. The steering mechanism is provided to orientate the axles of all the lines, or the major part of them, at different angles, so that all the wheel axles converge to a point.

The impossibility of turning the wheels beyond a certain angle (about 55° for the end axles) imposes restrictions on the use of these platforms, which necessitates extensive free areas for manoeuvring.

It has already been proposed, for special applications, to overcome these restrictions by orienting each wheel or each wheel train by an independent steering mechanism, all these mechanisms being synchronized by a central computer. This solution is heavy, complicated, fragile and too expensive to be commercially useable in worksite equipment.

A modification of this solution consists of providing each wheel train with a hydraulic distributor, the distributors being associated with a central control which enables both normal driving and cross movements to be effected as well as a circular movement of the platform around itself. However it is difficult to synchronize the operation of all the distributors and extremely accurate machining of all the mechanical parts is necessary. Moreover, in the proposed constructions, the wheeltrains can only be brought into an orientation at 90° after having placed all the wheeltrains in a straight line, which constitutes an unacceptable restriction.

Finally, wheels or axles provided only with one mechanism which orients all at the same angle can be provided. But this solution only permits rectilinear movement, if necessary crabwise or crosswise, and departs from the usual method of driving vehicles, which prohibits in fact a vehicle thus equipped from access to the highways.

It is an object of the present invention to avoid the above drawbacks, by requiring only the addition of simple supplementary means to the normal steering mechanisms of self-driven vehicles with several rows of orientable axles.

To this end, the invention provides more particularly a self-driven vehicle borne by several rows each of several axles and provided with a steering mechanism enabling the orientation of the axles on both sides of a median position to cause the self-driven vehicle to follow a curved path, each of the axles being provided with a mechanism enabling all the axles to be unlocked from the steering mechanism at the same time and means for bringing all the axles into at least one angular position determined with respect to the median position, identical for all the axles, characterized in that the steering mechanism comprises a plate fixed to the axle by an unlocking mechanism which comprises a bolt which locks the axle to the plate in a predetermined relative angular position, which bolt is provided with a deactivating control.

The conventional steering mechanism can include connecting rods of different length which couple the successive orientable axles in normal operation. These connecting rods enable the various axles to be given turning angles which correspond to a course of the self-driven vehicle around the same center. In practice, it will be advantageous to angularly locate the trains of wheels symmetrically, by means of jacks actuating those axles which are most remote from the midplane, the intermediate axles being driven from the end axles by a reducing linkage.

In general, an angular position at 90° from the median position will be provided, to enable sideways movement. Thus, the driving is akin to that of a travelling bridge crane, convenient and familiar to worksite personnel. However, this angular position can correspond to another angle, for particular applications, or there may be provided a second angular position, at 60° for example, enabling crabwise movement.

The invention will be better understood on reading the description which follows of a self-driven platform which constitutes a particular embodiment, given by way of non-limiting example. The description refers to the accompanying drawings, in which:

FIG. 1 is a simplified diagram showing the orientation of the axles of a platform in normal movement, the axles being oriented by the steering mechanism;

FIG. 2, similarly to FIG. 1, shows the axles oriented at 90° to the median direction, for sideways movement;

FIG. 4 shows, in a simplified manner, means enabling the orientation of an axle not driven directly by a steering jack at 90° from the median direction, in section along the line IV—IV of FIG. 5;

Figure 1:
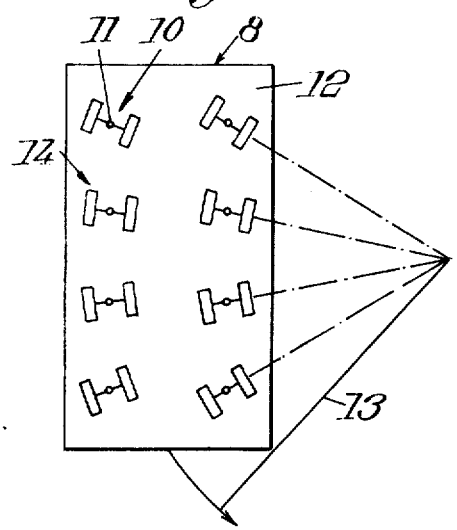
Figure 2:
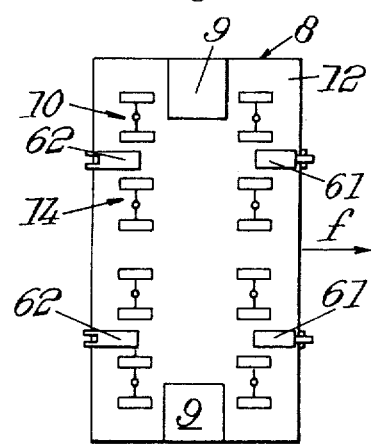
Figure 7:
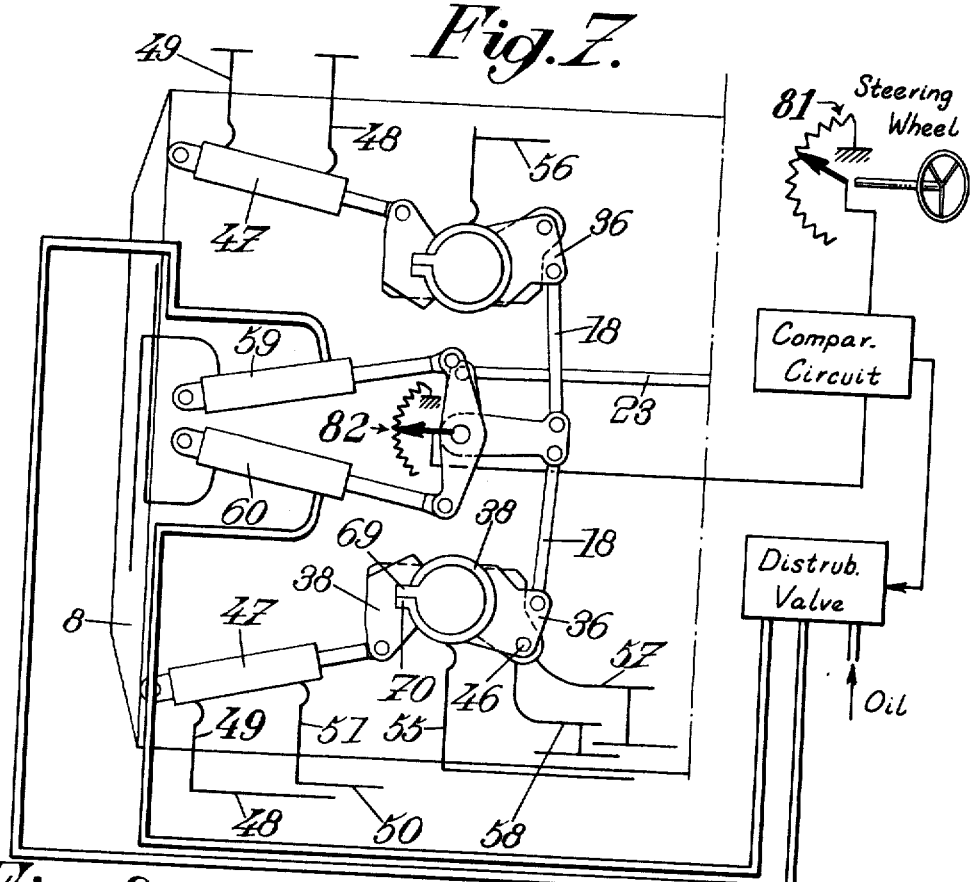
Figure 8A:
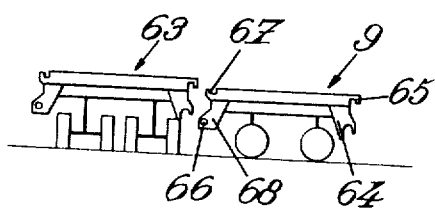
Figure 8B:
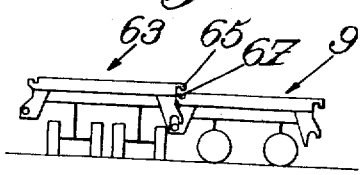
Figure 8C:
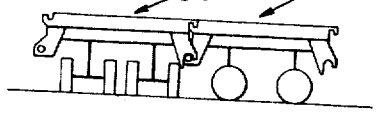

FIG. 6, similar to FIG. 4, shows in a simplified manner the arrangement of the various actuating members of an axle in the position where it holds this axle in a direction at 90° to the median position;

FIG. 7 is a diagram indicating the hydraulic connections of two front axles of a platform corresponding to the diagrams of FIGS. 1 and 2, with the exception of the connections of the drive motors and brakes, the parts being shown in the position of movement in a straight line;

FIGS. 8a to 8c are diagrams showing the successive phases of coupling between two platforms.

The self-driven platform 8 illustrated diagramatically in FIG. 1 comprises four rows of two axles. It will be assumed that the axles are all drive axles, but this condition is not indispensable It is however important that the axles furthest from the median transverse plane be drive axles, since these are the axles which have maximum efficiency in manoeuvring inasmuch as the lever arm of the steering force is the largest.

The transmission of the drive torque to the axles is advantageously hydraulic, each drive axle being provided with a rotary hydraulic motor supplied from a central system. With such an arrangement, it is easy to disengage certain of the axles which then become purely supporting axles.

It is also possible to supply certain of the axles selectively, and this characteristic has a particular advantage in the case of sideways movement, to position the platform very accurately by degrees.

Each of these axles, such as 10, is provided to rotate around a vertical axis 11 half-way between the two wheels of the axle. It should be noted that the mounting of each axle enables orientation of the wheels on the spot, which does not permit the use of bogies.

In FIG. 1, the axles are shown in the orientation that they occupy to cause the movement of the platform 12 that they bear, in a circle of radius 13.

Figure 3:
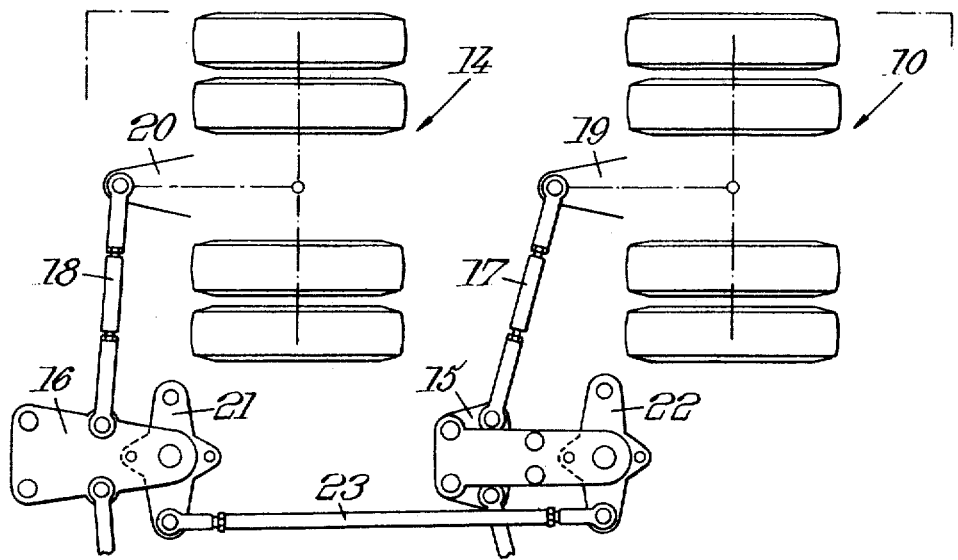
FIG. 3 is a diagram showing the connecting rods for the coupling between two successive axles of a same line of axles, enabling the movement illustrated in FIG. 1.

There already exist steering mechanisms enabling each of the axles of a self-driven platform to be given a suitable orientation with respect to the others. By way of example, FIG. 3 shows a coupling between two axles of a same line, 10 and 14 for example, enabling the turning angles of the two axles to be proportioned to one another. This mechanism, of known type, comprises for each row of axles servocoupled to another row, a plate 15 or 16 connected by a rod 17 or 18 to a tow bar 19 or 20 fast in rotation to the axle. The plates are coupled to one another, through relay plates 21 and 22, by means of a longitudinal connecting rod 23. Thus, it suffices to provide the first row of axles (or better, the first and the last) with distributor or servocoupling valve driving jacks, to drive all the others. The driving cabin or cabins has or have obviously a bulk which enables the axles to be freely oriented. These cabins are below the loading level of the platform. They may be placed as indicated in FIG. 2 or at an angle and diagonally. In this case, they will be mostly overlapping.

The steering mechanism may for example use an electrical comparator circuit which receives on one hand the signal supplied by a control potentiometer 81 (FIG. 7) driven by the steering wheel placed in the cabin 9 and, on the other hand, the signal provided by a similar potentiometer 82 placed on the steering pivot of each axle or of each row of axles provided with jacks. The output signal from the comparator actuates, after amplification, a progressive distributor valve which sends oil into the steering jacks proper. This distributor may be a servovalve which ensures progressive opening and closing. Thus, it is possible to control at a distance each steering axle from the cabin without a mechanical linkage which would be heavy and subject to buckling. It has the additional advantage of enabling the coupling of two pieces of equipment and their driving from a single cabin by a simple electrical connection, by distributing the control signal between the servovalves borne by the platform whereon the manoeuvring is carried out and the other platform. Moreover, this control signal is easily processed before transmitting it to a second platform coupled transversally to the first and which must be moved at the same time as the first around a curved part.

The steering mechanism which has just been described, like moreover all conventional mechanisms applicable to self-driven platforms, has the drawback of only allowing a limited turning angle, of the order of 55° at the most, on both sides of the median plane for the end axles. This turning angle is often insufficient in congested working areas.

The device illustrated in FIGS. 4 and 6 avoids this drawback. It enables the axles to be given an orientation at 90° to the median position, as indicated in FIG. 2, hence enabling sideways movement, as indicated by the arrows f. The wheel driving members remain the same for this sideways movement and for normal movement.

FIGS. 4 and 6 show an axle comprising two wheels 24 and 25, equipped with the device. The axle could equally have twin wheels, that is to say of the type shown in FIG. 3.

The axle proper 26 is connected to the chassis by a hydraulic suspension with a vertical jack, centered on the axis of rotation of the axle. Other types of coaxial suspension would be useable, but a suspension of adjustable height has distinct advantages, especially when the ability to couple several platforms is desirable, as will be seen below.

The suspension shown comprises a tube or guide-shaft 28 fixed, for example by welding at 29, to a socket 30 bolted to the chassis. In the tube 28 slides a tubular plunger 31 fixed to the axle 26. The suspension jack 32 is placed between the axle and the bottom of the tube 28. Balls, ball and socket joints or spherical caps are placed between the jack on one hand, and its supports on the other hand, to avoid interfering forces.

In the embodiment shown, the head of the jack is in the form of a male dome and is supported by a cover 33 bolted to the tube 28. A ball 33a is placed between the jack and the axle.

The eight jacks 32 of the platform are advantageously grouped into two assemblies each corresponding to an angle axle and the adjacent axle of the same line. The jacks of the four assemblies are actuated together by a flow-dividing system, constituted for example by four precision gearpumps coupled in rotation to have the same volumetric output delivery rate. A hyperstatic suspension is thus constructed, which is entirely acceptable on a naval worksite, and which has the advantage of withstanding considerable decentering of the load with respect to the platform. The essential thing is to obtain an ascent and descent of the plate which are adequately parallel. Now, the speeds of expansion and of contraction of the jacks are equal within 5 percent. The suspension circuit of two of the four assemblies or of all of the four assemblies may be completed by one or several elastic hydraulic accumulator systems to offset the drawbacks of hyperstatism. These accumulators are precalibrated to a given pressure. Several levels of stiffness can thus be obtained according as one, several or all the accumulators are isolated.

The normal steering mechanism comprises, from the plate 34 common to the two axles of a same row (FIGS. 4 and 6), a connecting rod 35 coupled to a plate 36 mounted to rotate on the socket 30, from which it is separated by a ball thrust bearing 37 or by a smooth bearing. However, this plate 36 does not drive the axle directly. It is intended to drive a relay plate 38 in normal operation, coupled to the axle by one or several scissor or compass mechanisms 39. A single scissor mechanism may be used, but two of them at 180° (FIG. 5) may be provided, the latter solution having the advantage of balancing the control. Between the plate 38 and the plate 36 is interposed a ball thrust bearing 40 which may, like the bearing 37, be replaced by a part of slippery material. Protective joints (not shown) may be placed around the bearings 37 and 40. A retaining washer 41 borne by a nut 42 holds the plate 38 in position. Bushes of self-lubricating material may be interposed between the parts rotating with respect to one another.

Figure 5:
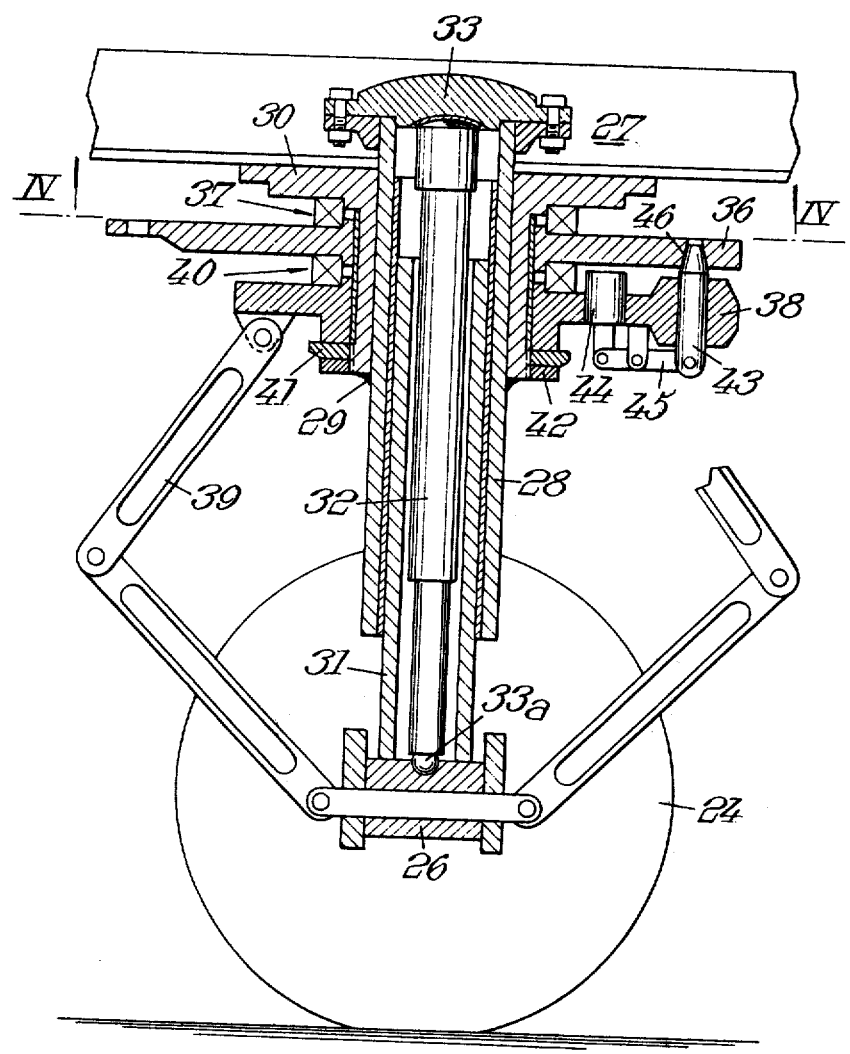
FIG. 5 is a sectional view along the line V—V of FIG. 4.

In normal driving state, a locking mechanism couples the plate 38 and the plate 36 in rotation. The locking mechanism of the embodiment illustrated in FIGS. 4 to 6 is constituted by a finger 43 which slides in a vertical housing pierced in a thickened portion of the plate 38. A fluid actuated jack 44 exerts, through a tipper element 45 a force which normally pushes the finger 43 back upwardly and keeps its terminal portion engaged in a hole 46 of the corresponding shape provided in the plate 36. When the finger is engaged, it closes an electrical contact (not shown) whose purpose will appear below. For safety reasons, it is preferable that the force of engagement of the finger be exerted permanently by a spring and that the jack provides, when it is actuated, an action opposing the disengagement of the finger.

The means enabling the axle to be brought into the position illustrated in FIG. 2 comprise a double-acting jack 47. In the embodiment illustrated, which is more advantageous, the jack 47 is mounted between the chassis of the vehicle and the plate 38. However it can be placed between the plate 36 and the plate 38. All the jacks 47 of the vehicle are actuated by a set of electrovalves which enable, in normal movement, all the compartments of the jacks to be connected together. The pressure drops in the pipes are consequently of little importance, inasmuch as, in the case of self-driven platform, the speeds are low and the turning movements very gradual. The set of electrovalves also connects all the inner compartments of the jacks 47 to a high pressure collector 48 supplying them through branch pipes 49 and, simultaneously, connects to a discharge pump a collector 50 communicating with all outer compartments by branch pipes 51. Finally, this set of electrovalves enables reversal of the connections of the collectors 48 and 50.

The operation of the device which has just been described, being evident from the preceding description, will only be indicated briefly below.

When the driver wishes for example to pass from the advancing position (in which the axles all occupy the orientation indicated in FIGS. 4 and 5) to the traversing position, he starts by actuating all the jacks 44 in a sense such that the fingers 43 are disengaged from the corresponding housings 46. Then, he actuates the set of electrovalves so as to connect all the inner compartments of the jacks 47 to the high pressure. The jacks then cause the plates 38 to rotate in reverse direction until they arrive at the stroke end stop. These stroke end stops can be either inside the jacks (case of FIG. 7), or on the other hand provided on the chassis. It will be seen from FIG. 5 that the plates 36 do not accompany the axles in their angular movement. This pivoting involves the rolling of the wheels 24 and 25 as indicated by the arrows $f'$ (FIG. 4). Consequently, the original orientation of the wheels is, so to speak, stored in a memory. The axles do not all arrive simultaneously in the position illustrated in FIG. 6 where they are immobilized, but this is no drawback. It must on the other hand be noted that this assembly in parallel of all the jacks relieves the strain on the hydraulic traversing mechanism. In fact, the arrangement adopted enables the axles to be oriented successively starting from those for which the opposing torque is minimum. When only the last axle has to be oriented, the whole of the power is available to actuate it. The advantage is preserved in practice by using the same jack to actuate two axles at a time but it is scarcely possible to go beyond this.

A sensor which detects the arrival of the axle in the position of FIG. 6, is advantageously provided on each axle. This sensor may be placed in the jacks, to the extent that the traverse position corresponds to the maximum stroke of the latter. If all the sensors are electrical and in series in a signalling circuit, this circuit can light a lamp on the instrument panel when the orienting manoeuvre is terminated for all the axles. It then suffices for the driver to actuate the motors in the appropriate sense to cause a transverse movement of the platform.

It is not indispensable to start from a median position to orient the axles crosswise. It suffices that the starting position should not be such that certain jacks 47 cannot turn the corresponding axles, which implies in practice, in the case of FIG. 7, that the crosswise positioning of an axle whose wheels are turned inwardly can only be effected if the turning angle does not exceed a certain angle with respect to the median position. It must be noted that this restriction is without practical consequence, since on the one hand all self-driven platforms comprise, for reasons of ease of operation, a turn indicator in the driving cabin. The steering wheel, on the other hand, may be provided with a resilient return device which, through an electro-hydraulic device, always tends to restore the wheels to the "in line" position as soon as the driver releases the steering wheel (in the manner of the centering action given by the "castor" in automobiles. In practice, this restoring action has time to act while the jacks of the wheels which are easiest to orient start their action.

To facilitate the work of the driver of the platform and to improve accuracy, there may be provided two driving cabins (one at each end) which are if necessary also actuated by a jack to rotate to 90° at the same time as the wheels. When the transmissions from the cabin are electrical, which is the case when the steering device is of the type described above, this orientation implies simply a supplementary jack. The cabins may also be fixed, but placed not on the axis of the platform, but in two diagonally opposite angles each offering the driver an angle of vision of about 270°.

When the driver wishes to return to normal movement, it suffices for him to deactivate the jacks 44 for the springs to push back the fingers 43 upwardly, and to reverse the actuation of the jacks 45. The fingers 43 enter their housings as soon as they are in alignment with them. The axles thus return to their original position and the detectors provided in the housings enable indication to be given to the driver that all the axles have in fact been restored to the original position, for the normal highway movement to be resumed.

The members associated with the two front axles may have the arrangement illustrated in FIG. 7, where the members corresponding to those shown in FIGS. 4 to 6 bear the same reference numeral, (although they relate to axles of a terminal row and not to an intermediate row as in the case of FIGS. 4 to 6). FIG. 7 shows the plate 36 driven by the normal steering mechanism through a connecting rod 18 and the relay plate 38 coupled to the axle. Between each of the plates 38 and a fixed point of the chassis, is mounted a hydraulic jack 47. The two hydraulic jacks are provided with branch pipes 49 and 51 supplied through collectors 48 and 50.

FIG. 7 also shows the supply pipes 55 and 56 of the suspension jacks (each of the pipes 55 and 56 also supplying the adjacent axle). As for the pipes 57 and 58, shown only on one of the axles, they supply the two compartments of the bolt control jack (not shown).

There is also seen in FIG. 7 the two steering jacks 59 and 60 which are supplied in opposition and drive the two axles shown symetrically, as well as the two axles placed immediately behind in the same line, through the bar 23. In addition the device of FIG. 7 comprises mechanical stop members of the return to the "highway travel" position, comprising lugs 69 and 70, one borne by the plate 36, the other by the plate 38. The fingers 43 of the locking and fastening devices between the plates enter their housing after there has been positive abutment between the lugs. Hence there is no risk of passing beyond the highway travel position nor of shearing the fingers 43 or of damaging them.

Platform 8 is advantageously provided to be couplable in width or "transversally" to a similar platform; it suffices for this to provide coupling brackets 61 and 62 of the type illustrated in FIG. 2 and locking bars for the brackets once the bores of the latter are aligned. However, it is preferable to constitute the coupling members to take advantage of the fact that the height of the chassis of the platform is adjustable by means of a telescopic hydraulic suspension. There can thus be obtained automatic centering by means of vertical members.

In the embodiment illustrated in FIGS. 8a to 8c, the two coupled platforms 9 and 63 are identical. Each comprises, on one side of the platform, stirrup 64 having a downwardly opening channel and tenons 65 of the plate also directed downwardly. The platform comprises, on the other side, bracket 68 placed so as to be bracketed to the bracket 64 of another platform and provided with longitudinal bars 66 as well as tenon 67 similar to the tenon 65, but directed upwardly. In addition, each platform comprises also locking members which only come into play once centering has been effected, as well as electrical connectors enabling the transmission of commands coming from a cabin of one of the platforms to the other platform.

The coupling between the platforms 9 and 63 is then effected in the following manner. Platform 63 is immobilized by means of its parking brake, the axles being in the position of longitudinal movement and the suspension jacks extended to hold the plate in high position.

The second platform 9 is brought parallel to the first by its driver, the axles being in the position of longitudinal movement, then the driver orients these axles for sideways movement (FIG. 8a).

The suspension jacks being actuated for the plate of the platform 9 to be in low position, the driver resumes the movement of the platform 9 and brings it into contact with the platform 63 (FIG. 8b). If the parallelism is not complete, the orientation of the platform 9 can be adjusted by causing the axles of an end row to advance selectively. The driver then actuates the raising of the plate of the platform 9 to engage the bar 66 in the channels of the brackets 64, then the tenons 67 under the tenons 65 of the platform 63. Locking by means of the horizontal movement members can then be actuated, and then the axles of the platform 9 restored into the position of forward movement. It only remains then to effect the necessary electrical and hydraulic connections. There is thus provided a platform capable of carrying a very much increased load and with an enlarged supporting base, hence capable of carrying parts, such as ships frames of very large size, and whose center of gravity is not exactly determined.

The invention is capable of very many modifications. For example, it is possible to provide two predetermined orientations of all the axles, one being at 90°, by means of jacks 47, by using removable stops.

I claim:

1. A steering mechanism for a self-propelled vehicle carried by a plurality of wheel rows, each including several wheel axles, said mechanism comprising a driver actuated main steering system for angular control of all said axles simultaneously for causing the vehicle to follow a rectilinear or circular path with all axles converging toward the center of the circular path; a locking mechanism associated with each of the axles for positively coupling all of the axles with the main steering system; means under the control of the driver for deactivating said locking mechanisms and uncoupling all said axles from said main steering system simultaneously; and an auxiliary steering system for angularly moving the axles to and from a position for transverse movement of the vehicle when actuated, comprising power cylinders independent from the main driving system and operatively connected to said axles and which in deactivated condition release said axles and permit free angular control of the axles by the main steering system.

2. A steering mechanism according to claim 1, having abutment means which positively limit the actuating path of the said power cylinders to the extent corresponding to transverse angular position of the axles.

3. A steering mechanism according to claim 1, wherein each said power cylinder is operatively connected to one of said axles and to the frame of the vehicle.

4. A steering mechanism according to claim 1, wherein said power cylinders are double acting fluid pressure cylinders and means are provided for connecting all said chambers of said cylinders together upon deactivation of said cylinders.

5. A steering mechanism according to claim 1, having display means activated responsive to completion of angular movement of all said axles to said transverse position.

6. A steering mechanism according to claim 1, having display means responsive to completion of positive coupling of all said axles with the main steering system by said locking mechanism.

7. A steering mechanism according to claim 1, wherein said main steering mechanism comprises a plate associated with each said axle and adapted to be connected with said axle in a predetermined relative angular position by said locking mechanism.

8. A steering mechanism according to claim 7, wherein a fluid pressure suspension is located between each said axle and the frame and is provided with means for adjusting the heigth of the frame with respect to the axle, each said axle being connected to a plate actuatable by said main steering system and said auxiliary steering system by a scissor linkage.

9. A steering mechanism according to claim 1, wherein each said axle is driven by a separate motor, said motors being actuated from a common prime mover and certain at least of said motors being provided with means for optionaly deactivated them, whereby the angular position of said vehicle may be adjusted during transverse movement.

10. A steering mechanism according to claim 1, wherein the main steering system comprises fluid pressure cylinders each associated with at least one axle and comprises an electrical comparator circuit having two inputs, one of said inputs being connected to a control potentiometer driven by a driver actuated steering wheel and the other input being connected to a potentiometer actuated by said fluid pressure cylinder, the output signal of said comparator being connected to the input of a solenoid actuated distributor valve controlling a fluid flow to and from said cylinder.

* * * * *